(12) United States Patent
Yang et al.

(10) Patent No.: US 9,632,388 B2
(45) Date of Patent: Apr. 25, 2017

(54) ELECTRONIC INK, ELECTRONIC PAPER AND METHOD FOR PREPARING ELECTRONIC INK

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Yiming Zhao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 104 days.

(21) Appl. No.: 14/424,557

(22) PCT Filed: Jun. 27, 2014

(86) PCT No.: PCT/CN2014/080913
§ 371 (c)(1),
(2) Date: Feb. 27, 2015

(87) PCT Pub. No.: WO2015/090025
PCT Pub. Date: Jun. 25, 2015

(65) Prior Publication Data
US 2015/0362820 A1 Dec. 17, 2015

(30) Foreign Application Priority Data
Dec. 19, 2013 (CN) .......................... 2013 1 0705379

(51) Int. Cl.
*G02B 26/00* (2006.01)
*G02F 1/167* (2006.01)

(52) U.S. Cl.
CPC ...... *G02F 1/167* (2013.01); *G02F 2001/1678* (2013.01)

(58) Field of Classification Search
CPC ............. G02F 1/167; G02F 2001/1678; G02F 2202/36; G02B 26/026; G09G 3/344
(Continued)

(56) References Cited

U.S. PATENT DOCUMENTS

| 7,561,140 | B1 | 7/2009 | Kanno |
| 2006/0132895 | A1* | 6/2006 | Miyazaki ............. G02B 26/026 359/296 |

(Continued)

FOREIGN PATENT DOCUMENTS

| CN | 1492275 A | 4/2004 |
| CN | 1796469 A | 7/2006 |

(Continued)

OTHER PUBLICATIONS

Chinese Office Action of Chinese Application No. 201310705379.1, mailed Nov. 23, 2015 with English translation.
(Continued)

*Primary Examiner* — Mahidere Sahle
(74) *Attorney, Agent, or Firm* — Collard & Roe, P.C.

(57) ABSTRACT

Disclosed are an electronic ink, an electronic paper and a method for preparing an electronic ink, wherein said electronic ink comprises display particles, an electrophoresis base liquid and a microcapsule prepolymer, wherein said display particles are an inorganic mixture of white pigments with a particle diameter of about 20-50 nm; said inorganic mixture of white pigments is formed by mixing at least one or more of zinc oxide, zinc sulfide and lithopone with boron oxide, lithium oxide and zirconium oxide. Said electronic ink is capable of improving image definition of display devices.

16 Claims, 1 Drawing Sheet

(58) Field of Classification Search
USPC .................................................. 359/290, 296
See application file for complete search history.

(56) References Cited

U.S. PATENT DOCUMENTS

2011/0105643 A1* 5/2011 Chun ...................... C08F 2/32
523/205
2012/0320308 A1* 12/2012 Yeo ................... G02F 1/133555
349/62
2013/0141779 A1 6/2013 Tian et al.

FOREIGN PATENT DOCUMENTS

| CN | 101210120 A | 7/2008 |
|---|---|---|
| CN | 102274709 A | 12/2011 |
| CN | 102654709 A | 9/2012 |
| CN | 102890350 A | 1/2013 |
| CN | 103760731 A | 4/2014 |
| KR | 10-2013-0109842 A | 10/2013 |

OTHER PUBLICATIONS

International Search Report and Written Opinion of the International Searching Authority with Notice of Transmittal of the International Search Report and Written Opinion of PCT/ CN2014/080913 in Chinese, mailed Sep. 26, 2014.
Second Chinese Office Action of Chinese Application No. 201310705379.1, mailed Jun. 14, 2016 with English translation.
English translation of the International Preliminary Report on Patentability and Written Opinion of the International Searching Authority of PCT/CN2014/080913, issued Jun. 21, 2016.

* cited by examiner

ELECTRONIC INK, ELECTRONIC PAPER AND METHOD FOR PREPARING ELECTRONIC INK

CROSS REFERENCE TO RELATED APPLICATIONS

This application is the National Stage of PCT/CN2014/080913 filed on Jun. 27, 2014, which claims priority under 35 U.S.C. §119 of Chinese Application No. 201310705379.1 filed on Dec. 19, 2013, the disclosure of which is incorporated by reference.

TECHNICAL FIELD

Embodiments of the present invention relate to electronic ink, electronic paper and a method for preparing electronic ink.

BACKGROUND

With the development of computer technology and the popularity of network, electronic paper, which displays like natural paper and thus avoids visual fatigue while reading, has received growing attention as a new generation of display devices.

Electronic paper is a display panel which is produced by electronic ink displayed through electrophoresis. Electronic ink, as an important material for electronic paper, generally comprises display particles, an electrophoresis base liquid, and capsule materials, wherein the display particles and the electrophoresis base liquid are encapsulated within the capsule via the capsule materials to avoid aggregation and precipitation of the display particles, thereby improving the stability of electronic ink.

Since display particles for forming electronic ink have a great particle diameter (generally greater than 100 nm) in an electronic paper made from electronic ink, the charged display particles dispersed in the electrophoresis base liquid swim directionally at a low velocity under the action of Coulomb force in an electrical field, thereby leading to both a slow response speed and a poor image definition of display devices.

SUMMARY

At least one embodiment of the present invention provides an electronic ink, an electronic paper and a method for preparing electronic ink, which can improve the image definition of display devices.

At least one embodiment of the present invention provides an electronic ink, comprising display particles, an electrophoresis base liquid and a microcapsule prepolymer, wherein the display particles are an inorganic mixture of white pigments with a particle diameter of about 20-50 nm. The inorganic mixture of white pigments is formed by mixing at least one or more of zinc oxide, zinc sulfide and lithopone with boron oxide, lithium oxide and zirconium oxide.

At least one embodiment of the present invention provides an electronic paper, comprising the electronic ink described above.

At least one embodiment of the present invention provides a method for preparing an electronic ink, comprising the steps of:

mixing a dispersant and an inorganic mixture of white pigments with an electrophoresis base liquid intimately and stirring continuously, to obtain a mixed solution;

dispersing the mixed solution in a three-roller machine to obtain a dispersed solution having display particles with a particle diameter of about 20-50 nm;

adding a surfactant and an electrophoresis base liquid to the dispersed solution and stirring continuously, to obtain an electrophoresis liquid; and mixing the electrophoresis liquid with a microcapsule prepolymer, stirring continuously under heating conditions, and then cooling down to room temperature, to obtain the electronic ink.

BRIEF DESCRIPTION OF THE DRAWINGS

In order to illustrate the embodiments of the present invention more clearly, the drawings of the embodiments of the invention will be briefly described below. Apparently, the drawings described below merely involve some embodiments of the present invention, and should not be understood as limitations to the present invention.

DETAILED DESCRIPTION

Figure 1:
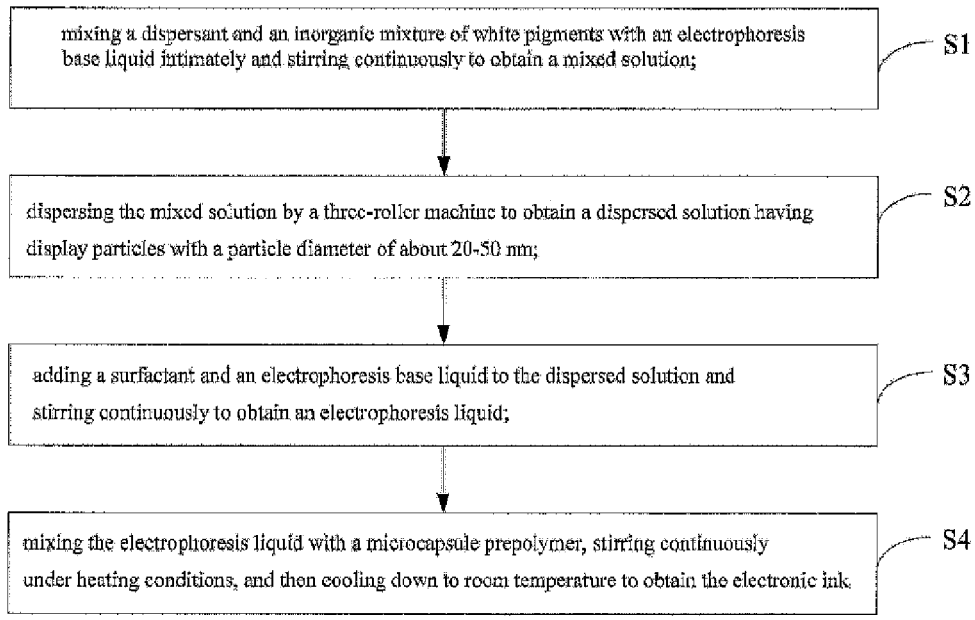
FIG. 1 is a method for preparing an electronic ink provided by an embodiment of the present invention.
Figure 2:
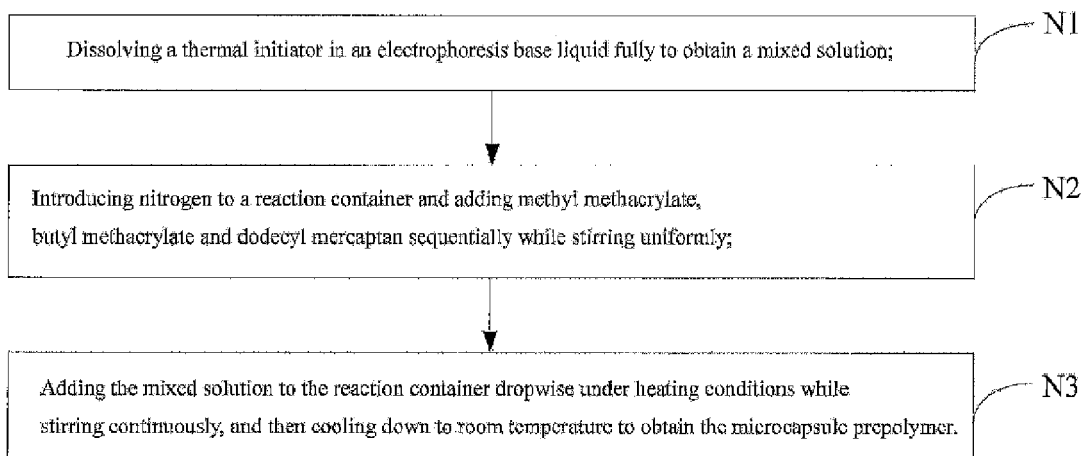
FIG. 2 is a method for preparing a microcapsule prepolymer provided by an embodiment of the present invention.

In order to make the object, technical solution and advantages of the embodiments of the invention clearer, the technical solutions of the embodiments of the invention will be described in a clear and complete way in connection with the drawings of the embodiments of the invention. Obviously, the embodiments described are part of but not all of the embodiments of the invention. Based on the embodiments described herein, all the other embodiments obtained by those skilled in the art without any inventive work are within the protection scope of the invention.

At least one embodiment of the invention provides an electronic ink, comprising display particles, an electrophoresis base liquid and a microcapsule prepolymer. The display particles are an inorganic mixture of white pigments with a particle diameter of about 20-50 nm. The inorganic mixture of white pigments is formed by mixing at least one or more of zinc oxide, zinc sulfide and lithopone with boron oxide, lithium oxide and zirconium oxide.

The white pigment as display particles can be selected from an inorganic mixture formed by mixing one or more of zinc oxide, zinc sulfide and lithopone with boron oxide, lithium oxide and zirconium oxide. The components are dispersed utilizing an appropriate amount (e.g., a small amount) of a dispersant and then further dispersed utilizing a machine (such as a mixer) to obtain a relatively smaller particle diameter. The amount of the dispersant can be determined according to requirement, and the embodiments of the present invention are not limited by a specific value of the amount. When each component in the inorganic mixture of white pigments is dispersed to form a nano-dispersion with a particle diameter of about 20-50 nm, a sufficiently small particle diameter and a unified mass are obtained, which enables the display particles to achieve a relatively uniform electrophoretic velocity in an externally applied electric field. In addition, after the white pigments are finally dispersed to form a nano-dispersion, the white pigments have the function to produce anions since each component in the white pigments is changed in terms of surface morphology and crystal structure.

It should be noted that a small amount of a dispersant needs to be used while dispersing each component in the white pigments so as to avoid aggregation among the dispersions because of a relatively smaller particle diameter and a relatively greater specific surface area of the dispersants after dispersion. On the premise of maintaining polarity of each component of the inorganic materials, the dispersant chosen in at least one embodiment of the present invention may be selected from a neutral solvent. If necessary, an appropriate amount (e.g., a small amount) of a stabilizer can be added in at least one embodiment of the present invention to lower surface tension of the electrophoresis base liquid such that the charged display particles are wetted in the electrophoresis base liquid to achieve a more uniform dispersion. The amount of the stabilizer can be determined according to requirement, and hence the embodiments of the present invention are not limited to a specific value of the amount.

At least one embodiment of the present invention provides an electronic ink. Since the display particles for preparing electronic ink are an inorganic mixture with a particle diameter of 20-50 nm, the particle diameter of the display particles is sufficiently small and thus the mass of the display particles formed is uniform. In an electrical field, the charged display particles can swim directionally in a uniform and swift way under the action of Coulomb force, which improves not only the response speed but also the image definition of display devices.

Since high concentrations of anions can be produced after the components in the white pigments for forming display particles are dispersed to form a mixed inorganic nano-dispersion, the air quality in the workshop can be effectively cleaned.

For example, the electrophoresis base liquid is an organic solvent with a refractive index greater than about 1.52. The electronic paper device in at least one embodiment of the present invention can be a reflection-type display device. Since the reflection-type display device displays images by reflecting light brightness in the environment which depends on the surrounding lighting conditions and the reflectivity of the display device itself, the solvent selected shall have high transmittance and high refractivity so as to reduce the influence of light brightness on the electrophoresis base liquid, thus leading to better visual readability and effectively avoiding visual fatigue while reading. For example, the refractive index of the organic solvent is between 1.52 and 1.7, such as 1.559, 1.63, 1.523 and 1.55. For another example, the organic solvent can be selected from one or more of bromobenzene, carbon disulfide, chlorobenzene, o-dichlorobenzene and nitrobenzene.

At least one embodiment of the present invention further provides the formula content of the electronic ink. For example, the parts by weight of the inorganic mixture of white pigments, the electrophoresis base liquid and the microcapsule prepolymer are respectively: inorganic mixture of white pigments, 5-10 parts; organic solvent, 40-90 parts; microcapsule prepolymer, 5-10 parts. The above formula content provided by at least one embodiment of the present invention may enable the inorganic mixture of white pigments to be dispersed uniformly in the electrophoresis base liquid and be encapsulated in the microcapsule prepolymer stably.

At least one embodiment of the present invention further provides an electronic paper comprising the electronic ink mentioned above. Since the display particles for preparing said electronic ink are an inorganic mixture with a particle diameter of 20-50 nm, the particle diameter of the display particles is sufficiently small and thus the mass of the display particles formed is uniform. In an electrical field, the charged display particles can swim directionally in a uniform and swift way under the action of Coulomb force, which improves not only the response speed of electronic books but also the image definition of electronic books.

Since high concentrations of anions can be produced after the components in the white pigments for forming display particles are dispersed to form a mixed inorganic nano-dispersion, air quality within the workshop can be effectively cleaned upon manufacturing electronic books.

At least one embodiment of the present invention further provides a method for preparing an electronic ink, as shown in FIG. 1, comprising:

Step S1: mixing a dispersant and an inorganic mixture of white pigments with an electrophoresis base liquid intimately and stirring continuously, to obtain a mixed solution.

In the step S1, an appropriate amount of the inorganic mixture of white pigments and the electrophoresis base liquid is used. Each component in the inorganic mixture of white pigments needs to be dispersed under the action of a small amount of a dispersant. In this step, the inorganic mixture of white pigments is 1 part by weight, and the electrophoresis base liquid is 0.2-0.25 part by weight.

The dispersant mainly serves to disperse each component in the white pigments. Without changing polarity of each component in the main materials, the dispersant chosen in at least one embodiment of the present invention is a neutral solvent. Appropriate dispersants known in the related technical fields can be selected, for example, from one or more of commercial wetting dispersant ByK161, Lubrizol Solsperse 32500 and Solsperse 22000.

Step S2: dispersing the mixed solution in a three-roller machine to obtain a dispersed solution having display particles with a particle diameter of about 20-50 nm.

In the step S2, for example, the mixed solution obtained above can be dispersed by a machine roller so as to obtain display particles with a smaller particle diameter.

Step S3: adding a surfactant and an electrophoresis base liquid to the dispersed solution and stirring continuously, to obtain an electrophoresis liquid.

In the step S3, it is required to add a surfactant to the dispersed solution to modify display particles such that they have certain charge and appropriate surface tension as well. By controlling the surface tension of display particles, affinity existing between display particles and the capsule walls and between display particles and the electrophoresis base liquid can further be controlled, enabling display particles to be uniformly distributed within microcapsules and resulting in an appropriate display speed. It should be noted that surfactants can be added either during the process of dispersing display particles or after completing dispersion of display particles, which does not affect modification by the surfactant.

In this step, for example, the surfactant is 0.1-10 part(s) by weight; and the electrophoresis base liquid is 0.25-0.3 part by weight. The electrophoresis base liquid added at an appropriate amount (e.g., a small amount) in the step and the electrophoresis base liquid added in the step S1 are the same solvent. A small amount of an electrophoresis base liquid is added herein, which helps to uniformly disperse the surfactant in the organic solvent. The amount of the electrophoresis base liquid can be determined according to requirement, and the embodiments of the present invention are not limited to a specific value of the amount.

In addition, the surfactant in this step can be selected from organic non-ionic surfactants and anionic surfactants. The organic non-ionic surfactant can be selected from fluorocarbon surfactants, which accounts for 0.1-0.3 part by weight of the total weight of the surfactant; the anionic surfactant can be selected from fatty acid salts, sulfonate or sulfate ester surfactants, for example, preferably sulfonate surfactants, more preferably alkylbenzene sulfonate surfactants, which may account for 1-4 part(s) by weight of the total weight of the surfactant.

Step S4: mixing the electrophoresis liquid with a microcapsule prepolymer, stirring continuously under heating conditions, and then cooling down to room temperature, to obtain the electronic ink In the step S4, for example, the electrophoresis liquid weighed is 1 part by weight, and the microcapsule prepolymer weighed is 0.1-0.8 part by weight. The electrophoresis liquid weighed is mixed with the microcapsule prepolymer and stirred continuously at a temperature of about 40-60° C. for about 1-2 hours, such that the electrophoresis liquid and the microcapsule prepolymer are fully reacted to prepare said electronic ink.

At least one embodiment of the present invention provides a method for preparing an electronic ink. In this preparation method, each component in the white pigments used and the organic solvent selected are from extensive sources; moreover, the procedures are simple and easy to operate. Since the display particles in the electronic ink are an inorganic mixture with a particle diameter of about 20-50 nm, the particle diameter of the display particles is sufficiently small and thus the mass of the display particles formed is uniform. Under the action of Coulomb force, the charged display particles can swim directionally in a uniform and swift way. The display devices prepared by the method have improved not only the response speed but also the image definition.

Since high concentrations of anions can be produced during operation of the method, air quality in the workshop can also be cleaned.

It should be noted herein that in the formula of the electronic ink provided by embodiments of the present invention, the white pigment can be replaced with a corresponding black pigment, e.g., carbon black, to prepare black electronic ink. Correspondingly, the method of the present invention for preparing white electronic ink in the embodiments of the present invention can also be applied to preparation of black electronic ink.

At least one embodiment of the present invention further provides a method for preparing the microcapsule prepolymer in the above method, comprising the steps of:

Step N1: fully dissolving a thermal initiator in an electrophoresis base liquid to obtain a mixed solution.

In the step N1, an appropriate amount of a thermal initiator is weighed to be dissolved in an organic solvent, for example, the thermal initiator is 0.3-0.5 part by weight, and the electrophoresis base liquid is 0.45-0.55 part by weight.

It should be noted that the thermal initiator used in this procedure mainly serves as a catalyst. The thermal initiator is first mixed with an appropriate amount of an electrophoresis base liquid and then added dropwise to the subsequent reaction container, which avoids violent reaction of reaction solutions within the reaction container, thereby preventing super-saturation of partial solution caused by failure to disperse the thermal initiator added to the reaction container. The thermal initiator used in this step is an azo initiator and can be selected from 2,2'-Azobis-(2-methylbutyronitrile), 2,2'-Azobis(isobutyronitrile) or 2,2'-Azobis(2,4-dimethylvaleronitrile). For example, it is azo 2,2'-Azobis-(2-methylbutyronitrile).

Step N2: nitrogen is introduced to the reaction container, and methyl methacrylate, butyl methacrylate and dodecyl mercaptan are added sequentially while stirring uniformly.

In the step N2, under the protection of nitrogen, an appropriate amount of each reaction material is weighed and added to the reaction container. For example, the methyl methacrylate is 1 part by weight; the butyl methacrylate is 1 part by weight; the dodecyl mercaptan is 0.2-0.5 part by weight. In the step, an appropriate amount of dodecyl mercaptan is added to adjust the particle diameter of display particles encapsulated within the microcapsule.

Step N3: the mixed solution is added dropwise to the reaction container under heating conditions while stirring continuously, and then cooled down to room temperature, to obtain a microcapsule prepolymer.

In the step N3, the mixed solution obtained in the above step N1 is added dropwise to the reaction container, and stirred continuously at a temperature of 40-60° C. for 1-5 hours, to finally obtain a microcapsule prepolymer.

At least one embodiment of the present invention provides a method for preparing a microcapsule prepolymer. The method prepares a microcapsule prepolymer by in-situ polymerization such that the microcapsule prepolymer exhibits stable properties to encapsulate the display particles and the electrophoresis base liquid, thereby uniformly and stably distributing the display particles in the microcapsule prepolymer. It can be understood that the method for preparing a microcapsule prepolymer provided by one embodiment of the present invention above turns out to achieve good effects and the microcapsule prepolymer obtained has stable properties. Those skilled in the art may prepare a microcapsule prepolymer by other methods.

In order to better illustrate the electronic ink, electronic paper and method for preparing electronic ink, explanations are made by specific examples as follows.

Example 1

Electronic Ink 1

Firstly, 9 parts of zinc oxide, 0.03 part of boron oxide, 0.12 part of lithium oxide and 0.15 part of zirconium oxide were weighed, and an appropriate amount (e.g., a small amount) of Solsperse 3250 was added for dispersion; secondly, 40.05 parts of bromobenzene were added while stirring continuously and then further dispersed by a three-roller machine, to obtain a dispersed solution; afterwards, 0.12 part of a fluorocarbon surfactant, 1.5 parts of a toluenesulfonate surfactant and 43.03 parts of bromobenzene were added to the dispersed solution and stirred continuously to obtain an electrophoresis liquid; finally, 6 parts of a microcapsule prepolymer were added for mixing with the electrophoresis liquid, and stirred continuously at a temperature of 40° C. for 1 hour, to obtain electronic ink 1.

Example 2

Electronic Ink 2

Firstly, 9 parts of zinc sulfide, 0.03 part of boron oxide, 0.22 part of lithium oxide and 0.15 part of zirconium oxide were weighed, and a small amount of Solsperse 3250 was added for dispersion; secondly, 39.78 parts of bromobenzene were added while stirring continuously and then further dispersed by a three-roller machine to obtain a dispersed solution; afterwards, 0.12 part of a fluorocarbon surfactant, 2 parts of a toluenesulfonate surfactant and 42.7 parts of bromobenzene were added to the dispersed solution and stirred continuously to obtain an electrophoresis liquid; finally, 6 parts of a microcapsule prepolymer were added for mixing with the electrophoresis liquid, and stirred continuously at a temperature of 42° C. for 1 hour, to obtain electronic ink 2.

Example 3

Electronic Ink 3

Firstly, 9 parts of lithopone, 0.3 part of boron oxide, 0.06 part of lithium oxide and 0.14 part of zirconium oxide were weighed, and a small amount of Solsperse 3250 was added for dispersion; secondly, 39.6 parts of carbon disulfide were added while stirring continuously, and then further dispersed by a three-roller machine, to obtain a dispersed solution; afterwards, 0.15 part of a fluorocarbon surfactant, 2.2 parts of a toluenesulfonate surfactant and 42.05 parts of carbon disulfide were added to the dispersed solution and stirred continuously to obtain an electrophoresis liquid; finally, 6.5 parts of a microcapsule prepolymer were added for mixing with the electrophoresis liquid, and stirred continuously at a temperature of 44° C. for 1.2 hours, to obtain electronic ink 3.

Example 4

Electronic Ink 4

Firstly, 3 parts of zinc oxide, 3 parts of zinc sulfide, 3 parts of lithopone, 0.1 part of boron oxide, 0.2 part of lithium oxide and 0.3 part of zirconium oxide were weighed and a small amount of Solsperse 3250 was added for dispersion; secondly, 35.51 parts of carbon disulfide were added while stirring continuously, and then further dispersed by a three-roller machine, to obtain a dispersed solution; afterwards, 0.17 part of a fluorocarbon surfactant, 2.4 parts of a toluenesulfonate surfactant and 46.02 parts of carbon disulfide were added to the dispersed solution and stirred continuously, to obtain an electrophoresis liquid; finally, 6.3 parts of a microcapsule prepolymer were added for mixing with the electrophoresis liquid, and stirred continuously at a temperature of 44° C. for 1.3 hours, to obtain electronic ink 4.

Example 5

Electronic Ink 5

Firstly, 4 parts of zinc oxide, 5 parts of zinc sulfide, 0.1 part of boron oxide, 0.2 part of lithium oxide and 0.2 part of zirconium oxide were weighed and a small amount of Solsperse 3250 was added for dispersion; secondly, 39.43 parts of chlorobenzene was added while stirring continuously, and then further dispersed by a three-roller machine, to obtain a dispersed solution; afterwards, 0.15 part of a fluorocarbon surfactant, 2.2 parts of a toluenesulfonate surfactant and 42.02 parts of chlorobenzene were added to the dispersed solution and stirred continuously, to obtain an electrophoresis liquid; finally, 6.7 parts of a microcapsule prepolymer were added for mixing with the electrophoresis liquid, and stirred continuously at a temperature of 46° C. for 1.4 hours, to obtain electronic ink 5.

Example 6

Electronic Ink 6

Firstly, 4 parts of zinc sulfide, 5 parts of lithopone, 0.1 part of boron oxide, 0.15 part of lithium oxide and 0.25 part of zirconium oxide were weighed and a small amount of Solsperse 3250 was added for dispersion; secondly, 39.26 parts of chlorobenzene were added while stirring continuously, and then further dispersed by a three-roller machine, to obtain a dispersed solution; afterwards, 0.12 part of a fluorocarbon surfactant, 2.2 parts of a toluenesulfonate surfactant and 42.02 parts of chlorobenzene were added to the dispersed solution and stirred continuously, to obtain an electrophoresis liquid; finally, 6.9 parts of a microcapsule prepolymer were added for mixing with the electrophoresis liquid, and stirred continuously at a temperature of 48° C. for 1.4 hours, to obtain electronic ink 6.

Example 7

Electronic Ink 7

Firstly, 4 parts of zinc oxide, 5 parts of lithopone, 0.2 part of boron oxide, 0.15 part of lithium oxide and 0.15 part of zirconium oxide were weighed and a small amount of Solsperse 3250 was added for dispersion; secondly, 37.92 parts of o-dichlorobenzene was added while stirring continuously, and then further dispersed by a three-roller machine, to obtain a dispersed solution; afterwards, 0.12 part of a fluorocarbon surfactant, 2.2 parts of a toluenesulfonate surfactant and 43.26 parts of o-dichlorobenzene were added to the dispersed solution and stirred continuously, to obtain an electrophoresis liquid; finally, 7 parts of a microcapsule prepolymer were added for mixing with the electrophoresis liquid, and stirred continuously at a temperature of 48° C. for 1.4 hours, to obtain electronic ink 7.

Example 8

Electronic Ink 8

Firstly, 4 parts of zinc sulfide, 5 parts of lithopone, 0.2 part of boron oxide, 0.2 part of lithium oxide and 0.3 part of zirconium oxide were weighed and a small amount of Solsperse 3250 was added for dispersion; secondly, 35.6 parts of o-dichlorobenzene were added while stirring continuously and then further dispersed by a three-roller machine, to obtain a dispersed solution; afterwards, 0.22 part of a fluorocarbon surfactant, 3 part of a toluenesulfonate surfactant and 43.98 parts of o-dichlorobenzene were added to the dispersed solution and stirred continuously, to obtain an electrophoresis liquid; finally, 7.5 parts of a microcapsule prepolymer were added for mixing with the electrophoresis liquid, and stirred continuously at a temperature of 50° C. for 1.6 hours, to obtain electronic ink 8.

Example 9

Electronic Ink 9

Firstly, 3 parts of zinc oxide, 2 parts of zinc sulfide, 4 parts of lithopone, 0.25 part of boron oxide, 0.4 part of lithium oxide and 0.25 part of zirconium oxide were weighed and a small amount of Solsperse 3250 was added for dispersion; secondly, 37.89 parts of nitrobenzene was added while stirring continuously and then further dispersed by a three-roller machine, to obtain a dispersed solution; afterwards, 0.25 part of a fluorocarbon surfactant, 3.5 parts of a toluenesulfonate surfactant and 40.46 parts of nitrobenzene were added to the dispersed solution and stirred continuously, to obtain an electrophoresis liquid; finally, 8 parts of a microcapsule prepolymer were added for mixing with the electrophoresis liquid, and stirred continuously at a temperature of 55° C. for 1.8 hours, to obtain electronic ink 9.

Example 10

Electronic Ink 10

Firstly, 2 parts of zinc oxide, 4 parts of zinc sulfide, 3 parts of lithopone, 0.4 parts of boron oxide, 0.3 part of lithium oxide and 0.3 part of zirconium oxide were weighed and a small amount of Solsperse 3250 was added for dispersion; secondly, 30.07 parts of nitrobenzene was added while stirring continuously and then further dispersed by a three-roller machine, to obtain a dispersed solution; afterwards, 0.3 part of a fluorocarbon surfactant, 4 parts of a toluenesulfonate surfactant and 47.13 parts of nitrobenzene were added to the dispersed solution and stirred continuously, to obtain an electrophoresis liquid; finally, 8.5 parts of a microcapsule prepolymer were added for mixing with the electrophoresis liquid, and stirred continuously at a temperature of 60° C. for 2 hours, to obtain electronic ink 10.

Performance Test:

(1) Test of Particle Diameter of Display Particles

Each electronic ink of Examples 1-10 was separately used for coating to obtain a test piece with an area of 5×5 cm². Each test piece was placed under a laser nanoparticle size analyzer for observation, and the particle diameter of each test piece was recorded as shown in Table 1.

TABLE 1

Particle diameter of each test piece of Examples 1-10

|  | particle diameter (nm) |
|---|---|
| Example 1 | 28 |
| Example 2 | 35 |
| Example 3 | 30 |
| Example 4 | 37 |
| Example 5 | 33 |
| Example 6 | 45 |
| Example 7 | 38 |
| Example 8 | 35 |
| Example 9 | 43 |
| Example 10 | 39 |

As indicated above, the particle diameter of the display particles in the electronic ink of each example was between 20 and 50 nm. Display particles had a sufficiently small particle diameter such that they can swim directionally in a uniform and swift way under the action of Coulomb force in an electronic field, which improved not only the response speed of display devices but also the image definition of display devices.

(2) Test of Anion Concentration

Each electronic ink of Examples 1-10 was tested for anion concentration as follows:

firstly, anion concentration $D_b$ of background air in the environment was tested by an air anion detector with a resolution of 10 pcs/cm³;

secondly, each electronic ink was separately used for coating to obtain test pieces with an area of 5×5 cm². Each test piece was placed about 2 cm from the air inlet of the air anion detector for testing anion concentration $D_a$ for 5 times in a state of shake or friction, and the maximum value was recorded;

finally, the effective anion concentration for each test piece was calculated by $D=D_a-D_b$, the result of which was shown in Table 2.

TABLE 2

Anion concentration for each test piece of Examples 1-10

|  | anion (pcs/cm³) |
|---|---|
| Example 1 | 802 |
| Example 2 | 900 |
| Example 3 | 1020 |
| Example 4 | 1110 |
| Example 5 | 1020 |
| Example 6 | 1018 |
| Example 7 | 1025 |
| Example 8 | 1100 |
| Example 9 | 1280 |
| Example 10 | 1320 |

The anion concentration refers to the number of anions per unit volume air. The larger the number of anions in the air, the higher the anion concentration and the stronger the capability to reduce air pollution and improve air quality. Air purification in workshops of electronic ink is achieved when the anion concentration is greater than 800 pcs/cm³. By testing each electronic ink of the above-mentioned examples, it can be concluded that the anion concentration of each test piece reaches the standard and is above the standard, which turns out to be effective. Therefore, the electronic ink can be used in the manufacture of display devices to effectively reduce pollution and improve air quality of production environments.

The foregoing is only the illustrative embodiments of the present invention and not intended to limit the scope of protection of the present invention. The scope of protection of the present invention should be defined by the appended claims.

The present application claims the benefits of the Chinese Application No. 201310705379.1 filed on Dec. 19, 2013, the entire disclosure of which is incorporated herein by reference.

The invention claimed is:

1. An electronic ink, comprising display particles, an electrophoresis base liquid and a microcapsule prepolymer, wherein said display particles are an inorganic mixture of white pigments with a particle diameter of about 20-25 nm;
    the inorganic mixture of white pigments is formed by mixing at least one or more of zinc oxide, zinc sulfide and lithopone with boron oxide, lithium oxide and zirconium oxide;
    the inorganic mixture of white pigments is about 5-10 parts by weight;
    the electrophoresis base liquid is about 40-90 parts by weight; and
    the microcapsule prepolymer is about 5-10 parts by weight.

2. The electronic ink according to claim 1, wherein said electrophoresis base liquid is an organic solvent with a refractive index of greater than about 1.52.

3. The electronic ink according to claim 2, wherein said organic solvent is selected from one or more of bromobenzene, carbon disulfide, chlorobenzene, o-dichlorobenzene and nitrobenzene.

4. An electronic paper, comprising the electronic ink according to claim 1.

5. An electronic paper according to claim 4, wherein said electrophoresis base liquid is an organic solvent with a refractive index of greater than about 1.52.

6. An electronic paper according to claim 5, wherein said organic solvent is selected from one or more of bromobenzene, carbon disulfide, chlorobenzene, o-dichlorobenzene and nitrobenzene.

7. A method for preparing an electronic ink, comprising:
mixing a dispersant and an inorganic mixture of white pigments with an electrophoresis base liquid intimately and stirring continuously to obtain a mixed solution;
dispersing the mixed solution by a three-roller machine to obtain a dispersed solution having display particles with a particle diameter of about 20-50 nm;
adding a surfactant and an electrophoresis base liquid to the dispersed solution and stirring continuously to obtain an electrophoresis liquid; and
mixing the electrophoresis liquid with a microcapsule prepolymer, stirring continuously under heating conditions, and then cooling down to room temperature to obtain the electronic ink.

8. The preparation method according to claim 7, wherein, the inorganic mixture of white pigments is about 1 part by weight; and
the electrophoresis base liquid is about 0.2-0.25 part by weight.

9. The preparation method according to claim 7, wherein the surfactant is about 0.1-10 part(s) by weight; and
the electrophoresis base liquid is about 0.25-0.3 part by weight.

10. The preparation method according to claim 9, wherein said surfactant is selected from non-ionic organic surfactants and anionic surfactants.

11. The preparation method according to claim 7, wherein the electrophoresis liquid is about 1 part by weight; and
the microcapsule prepolymer is about 0.1-0.8 part by weight.

12. The preparation method according to claim 7, wherein the reaction condition is stirring at a temperature of about 40-60° C. for about 1-2 hours.

13. The preparation method according to claim 7, wherein said microcapsule prepolymer is prepared by a method comprising:
dissolving a thermal initiator in an electrophoresis base liquid fully to obtain a mixed solution;
introducing nitrogen to a reaction container and adding methyl methacrylate, butyl methacrylate and dodecyl mercaptan sequentially while stirring uniformly;
adding the mixed solution to the reaction container dropwise under heating conditions while stirring continuously, and then cooling down to room temperature to obtain the microcapsule prepolymer.

14. The preparation method according to claim 13, wherein
the thermal initiator is about 0.3-0.5 part by weight; and
the electrophoresis base liquid is about 0.45-0.55 part by weight.

15. The preparation method according to claim 13, wherein
the methyl methacrylate is about 1 part by weight;
the butyl methacrylate is about 1 part by weight; and
the dodecyl mercaptan is about 0.2-0.5 part by weight.

16. The preparation method according to claim 13, wherein the reaction condition is stirring at a temperature of about 40-60° C. for about 1-5 hours.

\* \* \* \* \*